(12) United States Patent
Elkins, Jr.

(10) Patent No.: US 7,040,634 B1
(45) Date of Patent: May 9, 2006

(54) SNOWSKATEBOARD

(76) Inventor: Paul Elkins, Jr., P.O. Box 1212, Crested Butte, CO (US) 81224

(*) Notice: Subject to any disclaimer, the term of this patent is extended or adjusted under 35 U.S.C. 154(b) by 13 days.

(21) Appl. No.: 10/753,888

(22) Filed: Jan. 7, 2004

Related U.S. Application Data

(63) Continuation-in-part of application No. 10/001,932, filed on Oct. 31, 2001, now abandoned.

(51) Int. Cl.
*B62B 9/04* (2006.01)
*B62B 13/00* (2006.01)

(52) U.S. Cl. .............. 280/14.25; 280/14.26; 280/26; 280/22.1

(58) Field of Classification Search ............ 280/7.12, 280/7.14, 13, 16, 12, 28, 14.21, 14.22, 14.25, 280/14.26, 11.12, 11.27, 11.28, 87.042, 809, 280/600, 604, 605, 607, 36, 221, 17, 15, 280/21.1, 26
See application file for complete search history.

(56) References Cited

U.S. PATENT DOCUMENTS

| | | | |
|---|---|---|---|
| 4,116,455 A | 9/1978 | Dotson et al. | 280/7.12 |
| 4,161,323 A | 7/1979 | Wetteland | 280/7.12 |
| 4,163,565 A | 8/1979 | Weber | 280/16 |
| 4,165,091 A | 8/1979 | Chadwick | 280/12 H |
| 4,194,753 A | 3/1980 | Schrishuhn, Jr. | 280/13 |
| 4,221,394 A | 9/1980 | Campbell | 280/12 H |
| 4,225,145 A | 9/1980 | Carr | 280/7.14 |
| 4,784,233 A | 11/1988 | Favors | 280/12 H |
| 5,022,668 A | 6/1991 | Kenny | 280/7.14 |
| 5,285,742 A * | 2/1994 | Anderson | 114/43 |
| D346,193 S | 4/1994 | Bryce | D21/227 |
| 5,330,214 A | 7/1994 | Brooks et al. | 280/87.042 |
| 6,311,990 B1 | 11/2001 | Landry | 280/14.26 |
| 6,341,786 B1 | 1/2002 | Kermis | 280/14.22 |
| 6,619,674 B1 * | 9/2003 | Baldwin | 280/14.25 |
| 6,648,348 B1 * | 11/2003 | Link | 280/14.25 |
| 6,682,083 B1 * | 1/2004 | Melcher | 280/14.26 |
| 6,736,414 B1 * | 5/2004 | Farrally-Plourde | 280/16 |
| 6,773,021 B1 * | 8/2004 | Breuer et al. | 280/14.21 |
| 2005/0073143 A1 * | 4/2005 | Ouellette | 280/809 |

OTHER PUBLICATIONS

Items 1 & 3 of *Trans World Snowboarding 2002 Buyers Guide*, pp. 50-51, Aug. 2001. (Item 2 is one embodiment of the claimed invention and is not prior art.

* cited by examiner

*Primary Examiner*—Christopher P. Ellis
*Assistant Examiner*—G B Klebe
(74) *Attorney, Agent, or Firm*—Sierra Patent Group, Ltd.

(57) ABSTRACT

A snowskateboard includes a support deck having an upper side and a lower side opposite the upper side. First and second trucks are mounted to the lower side. The trucks include rotatable yokes having axles. A set of first runners is disposed over the first yoke axle. A set of second runners is disposed over the second yoke axle. A first biasing mount is mounted in each of the first runners and disposed over the first axle. The first biasing mounts each have first biasing members configured to bias in a torsional direction relative to the first truck axle. A second biasing mount is mounted in each of the second runners and is disposed over the second axle. The second biasing mounts each have second biasing members configured to bias in a torsional direction relative to the second axle.

6 Claims, 10 Drawing Sheets

SNOWSKATEBOARD

CROSS-REFERENCE TO RELATED APPLICATION

This application is a continuation-in-part of co-pending application Ser. No. 10/001,932 filed on Oct. 31, 2001, now abandoned, incorporated herein by reference.

BACKGROUND

This apparatus relates to sliding recreational devices, more particularly to a snowskateboard having unique support and runners.

Devices have been created for riding on snow and ice that use the same principals for turning and control as the skateboard. Whereas these devices may have operated on a basic level, none have combined many of the features that may be needed to achieve a level of control and performance comparable to skateboarding. These devices may lack the capability for allowing for tricks, maneuvers and acrobatics, things which contribute to making skateboarding challenging and enjoyable. Further, these devices may not have a means for stopping a runaway device if one accidentally dismounts while riding downhill.

Associated with acrobatic maneuvers conducted on a skateboard is the premature dismounting of the rider once he or she has lost his or her balance on the device while attempting a trick. In skateboarding, this is generally not a problem, since much of the skateboarding is done on level ground. However, devices that incorporate aspects of snowboarding and skateboarding may take place on downhill slopes, thus when a rider loses control of his or her device the device may have a tendency to continue down the slope with increasing speed. This rapid unmanned travel of the device could lead to serious collision and injury to down slope skiers who are unaware of the accident dismount of the rider.

There is a need for an easily and inexpensively manufactured snowboard-like apparatus that has flexibility and control of a skateboard for the performance of acrobatics. To compensate for the increase chance of accidental rider dismounting that accompanies the increasing difficulty of snowboard tricks and acrobatics, there is a need for an automatic braking or stopping system associated with the apparatus. Such an apparatus may be able to be used on various surfaces, including, but not limited to: snow, ice, grass, dirt and water.

SUMMARY

The disclosure is directed toward a snowskateboard including a support deck having an upper side and a lower side opposite the upper side. First and second trucks are mounted to the lower side. The trucks include rotatable yokes having axles. A set of first runners is disposed over the first yoke axle. A set of second runners is disposed over the second yoke axle. A first biasing mount is mounted in each of the first runners and disposed over the first axle. The first biasing mounts each have first biasing members configured to bias in a torsional direction relative to the first truck axle. A second biasing mount is mounted in each of the second runners and is disposed over the second axle. The second biasing mounts each have second biasing members configured to bias in a torsional direction relative to the second axle.

In another embodiment the disclosure is directed toward a snowskateboard comprising a support deck having an upper side and a lower side opposite the upper side. A first truck is mounted to the lower side. The first truck includes a first yoke having a first axle disposed in the first yoke. A first left runner is disposed over the first axle and a first right runner is disposed over the first axle opposite the first left runner. A first biasing mount is disposed over the first axle and is mounted in each of the first left runner and the first right runner. The first biasing mount has a first biasing member configured to bias the first biasing mount in a torsional direction relative to the first axle. A second truck is mounted to the lower side distal from the first truck. The second truck includes a second yoke having a second axle disposed in the second yoke. A second left runner is disposed over the second axle and a second right runner is disposed over the second axle opposite the second left runner. A second biasing mount is disposed over the second axle and is mounted in each of the second left runner and the second right runner. The second biasing mount has a second biasing member configured to bias the second biasing mount in a torsional direction relative to the second axle. The embodiment can be modified wherein each of the first biasing mounts and the second biasing mount are configured to bias each respective first left runner, first right runner, second left runner and second right runner in at least one of a level position, a rear rotated position and a forward rotated position. The embodiment disclosed can include with each of the first left runner, the first right runner, the second left runner and the second right runner at least one protuberance extending from a snow-side surface. Each at least one protuberance can include a rail extending from the protuberance distal from the snow-side surface. The rail is selected from the group consisting of metal material, ceramic material, diamond material, hardened plastic material, and hardened polymer material. Each of the first biasing member and the second biasing member comprise a torsion spring disposed over the first axle and the second axle respectively. Each of the first biasing member and the second biasing member comprise a rack and pinion mechanism, wherein the rack is disposed between rack biasing members. The snowskateboard can be configured such that each of the first left runner, the first right runner, the second left runner and the second right runner include a runner body defining a rack biasing member cavity configured to house a rack biasing member. The rack biasing member is disposable over one of the first axle and the second axle.

In a further embodiment the disclosure is directed toward a snowskateboard comprising a support deck having an upper side and a lower side opposite the upper side. A first truck is mounted to the lower side. The first truck comprises a first truck base having a first truck base body. The first truck base body includes a mount side and a support side opposite the mount side. The first truck base body includes a front end and a rear end opposite the front end. The truck base body includes a first pivot support formed in the support side proximate the rear end of the first truck base body and a first coupling support formed in the support side proximate the first front end of the first truck base body. The first truck comprises a first truck yoke having a first yoke body. The first yoke body includes a first axle support portion and a first coupling portion extending from the first axle support portion. A first pivot portion extends from the first axle support portion distal from the first coupling portion. The first coupling portion is configured to couple to the first coupling support and the first pivot portion is configured to couple to the first pivot support. The first truck yoke has a first axle disposed in the first axle support portion substantially orthogonal to the first coupling portion and the first pivot portion of the first yoke body. The first axle has a left side and a right side opposite the left side. A first left spring loaded mount is disposed over the left side of the first axle. A first right spring loaded mount is disposed over the right side of the first axle. The first left spring loaded mount and the first right spring loaded mount each include a first biasing member configured to bias the first left spring loaded mount and the first right spring loaded mount in a torsional direction relative to the first axle. A first left runner is disposed over the first left spring loaded mount. A first right runner is disposed over the first right spring loaded mount. A second truck is mounted to the lower side distal from the first truck. The second truck comprises a second truck base having a second truck base body. The second truck base body includes a second mount side and a second support side opposite the second mount side. The second truck base body includes a second front end and a second rear end opposite the second front end. The second truck base body includes a second pivot support formed in the second support side proximate the second rear end of the second truck base body. A second coupling support is formed in the second support side proximate the second front end of the second truck base body. The second truck comprises a second truck yoke having a second yoke body. The second yoke body includes a second axle support portion and a second coupling portion extending from the second axle support portion. A second pivot portion extends from the second axle support portion distal from the second coupling portion. The second coupling portion is configured to couple to the second coupling support and the second pivot portion is configured to couple to the second pivot support. The second truck yoke has a second axle disposed in the second axle support portion substantially orthogonal to the second coupling portion and the second pivot portion of the second yoke body. The second axle has a left side and a right side opposite the left side. A second left spring loaded mount is disposed over the left side of the second axle and a second right spring loaded mount is disposed over the right side of the second axle. The second left spring loaded mount and the second right spring loaded mount each include a second biasing member configured to bias the second left spring loaded mount and the second right spring loaded mount in a torsional direction relative to the second axle. A second left runner is disposed over the second left spring loaded mount. A second right runner is disposed over the second right spring loaded mount.

In another embodiment, the disclosed system is directed towards a riding apparatus comprising a riding deck with a top side and an underside. At least one truck is affixed to the underside of the riding deck. At least one spring loaded mount is rotatably attached to each of the at least one truck. One runner is rigidly attached to each of the at least one spring loaded mounts. The runner is configured such that the longitudinal axis of the runner is parallel to the longitudinal axis of the deck when in a riding position. Each of the at least one spring loaded mounts is configured to rotate the runner from a first riding position to a first non-level position when the mount has less than a minimum force acting on it.

A method of using a snowskateboard is disclosed. The method comprises selecting a set of snowskateboard runners. The set of snow skateboard runners comprises a first left runner having a first biasing mount mounted in the first left runner and a first right runner having a first biasing mount mounted in the first right runner and a second left runner having a second biasing mount mounted in the second left runner and a second right runner having a second biasing mount mounted in the second right runner. The method includes mounting the first left runner on an axle of a first skateboard truck, wherein the first biasing mount is disposed over the first skateboard truck axle. The method includes mounting the first right runner on the axle of the first skateboard truck opposite the first left runner, wherein the first biasing mount is disposed over the first skateboard truck axle. The method includes mounting the second left runner on an axle of a second skateboard truck, wherein the second biasing mount is disposed over the second skateboard truck axle. The method includes mounting the second right runner on the axle of the second t skateboard truck opposite the second left runner, wherein the second biasing mount is disposed over the second skateboard truck axle. The method includes adjusting each of the first biasing mounts and the second biasing mounts to configure each respective the first left runner, the first right runner, the second left runner and the second right runner biased in at least one of a level position, a rear rotated position and a forward rotated position.

DETAILED DESCRIPTION

Those of ordinary skill in the art will realize that the following description of the present disclosed system is illustrative only and not in any way limiting. Other embodiments of the disclosed system will readily suggest themselves to such skilled persons.

The disclosed apparatus may be called a snowskateboard. However, the snowskateboard may also be used on surfaces such as, but not limited to: snow, ice, grass, dirt, and water.

Figure 1:
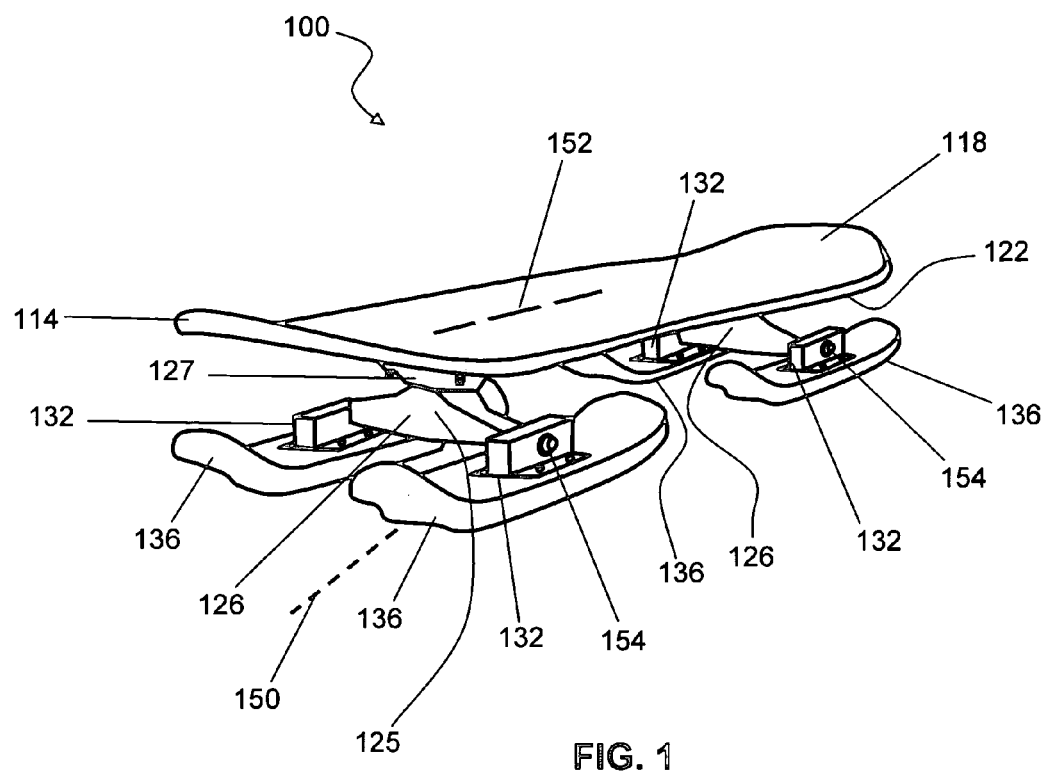
FIG. 1 the perspective view of one embodiment of the disclosed apparatus.

Referring to FIG. 1, one embodiment of the disclosed apparatus a snowskateboard 100 is shown. The snowskateboard 100 is comprised of a rider-supporting deck (simply support deck or deck) 114. The deck has an upper side 118 and a lower side 122. A rider (not shown) stands on the upper side 118 to ride the snowskateboard 100. Affixed to the lower side 122 are two (2) trucks 126. The trucks 126 are preferably skateboard style trucks 126 that have a yoke 125 rotatably biased and mounted in a base 127. Rotatably attached to each truck 126 via spring loaded mounts (or simply biasing mounts) 132 are runners 136. The deck may comprise the same materials as used for skateboard manufacturing. The deck may also include additional features, including but not limited to: laminated deck surface that is impervious to moisture; deck sides comprised of a moisture inhibiting material or treatment, deck top may have a grip surface. Other non-limiting features of the deck may include different sized and shaped decks to accommodate various conditions, type of riding, and personal preferences. When the apparatus is in a riding position, a longitudinal axis of the each of the runners 150 is parallel to a longitudinal axis of the deck 152 (see FIG. 3). The relationship of the runner longitudinal axis 150 to the deck longitudinal axis 152 can be altered depending on the terrain of the surface being ridden and the settings of the biasing mounts 132. Each individual runner 136 can be separately adjusted (rotary adjustment, axial adjustment) relative to an axle 154 of the truck 126.

Figure 2:
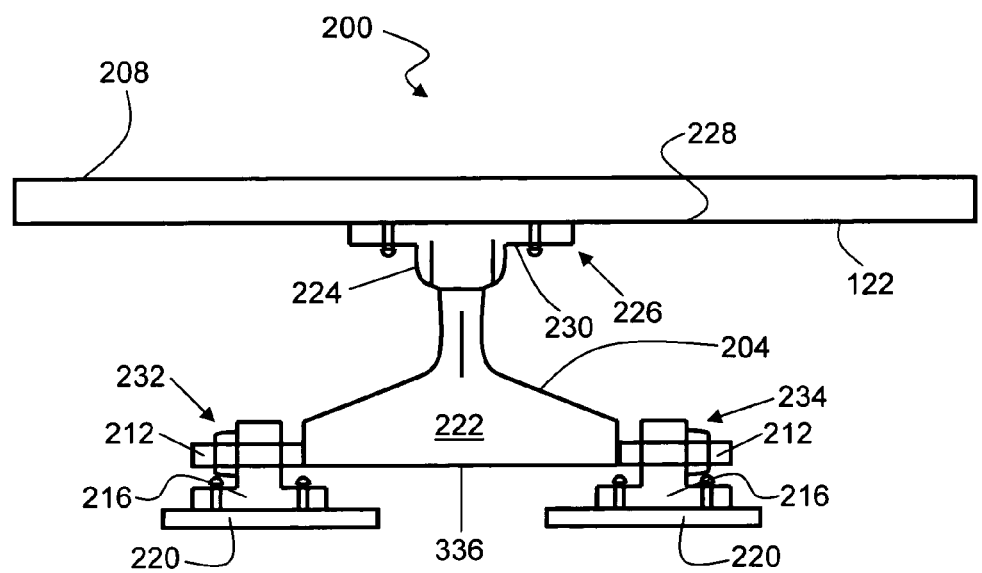
FIG. 2 is a front view of one exemplary embodiment of the disclosed apparatus.
Figure 3:
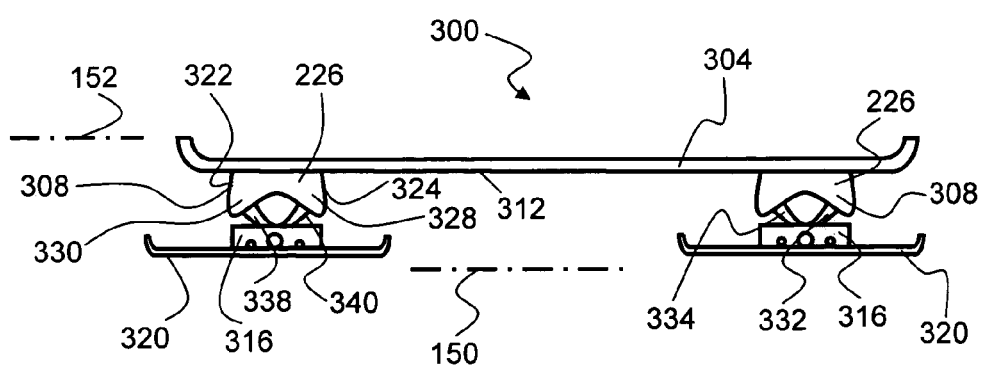
FIG. 3 is a side view of one exemplary embodiment of the disclosed apparatus.

Referring to FIGS. 2 and 3, another view of an embodiment of a disclosed snowskateboard 200 is illustrated. FIG. 2 is a front cross-sectional view through a plane intersecting a truck 204. The support deck 208 is shown rigidly attached to the truck 204. The truck axles 212 are shown with the spring loaded mounts 216 rotatably coupled to the truck 204. The inner workings of the spring loaded mounts 216 are not shown in this view. Rigidly attached to the spring loaded mounts 216 are the runners 220. The truck 204 includes a yoke 222 mounted in a truck base 224. The truck base 224 includes a truck base body 226. The truck base body 226 includes a mount side 228 and a support side 230 opposite the mount side 228. The mount side 228 mounts to the lower side 122.

Referring to FIG. 3, a side view of one embodiment of the disclosed apparatus 300 is shown. The rider support deck 304 is shown with two trucks (a first truck and a second truck) 308 attached to the deck lower side 312. Two of the four spring loaded mounts 316 are shown coupled to the trucks 308. Two of the four runners 320 are shown rigidly attached to the spring loaded mounts 316. The truck base body 226 includes a front end 322 and a rear end 324 opposite the front end 322. The truck base body 226 includes a pivot support 328 formed in the support side 230 proximate the rear end 324 of the truck base body 226 and a coupling support 330 formed in the support side 230 proximate the front end 322 of the truck base body 226. The truck comprises a truck yoke 332 having a yoke body 334. The yoke body 334 includes an axle support portion 336 and a coupling portion 338 extending from the axle support portion 336. A pivot portion 340 extends from the axle support portion 336 distal from the coupling portion 338. The coupling portion 338 is configured to couple to the coupling support 330 and the pivot portion 340 is configured to couple to the pivot support 328. The truck yoke 332, 222 has an axle 212 disposed in the axle support portion 336 substantially orthogonal to the coupling portion 338 and the pivot portion 340 of the yoke body 334. The axle 212 has a left side 232 and a right side 234 opposite the left side 232.

Figure 4A:
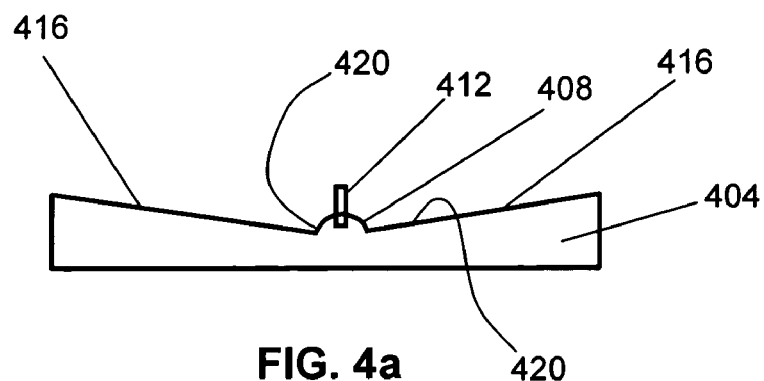
FIGS. 4a–4c are views of several embodiments for exemplary runners.
Figure 4B:
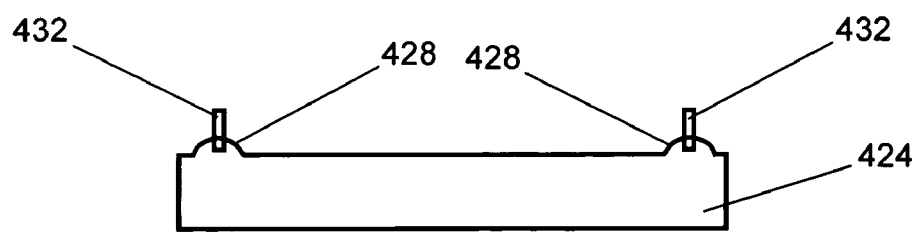
Figure 4C:

Referring to FIGS. 4*a–c*, different embodiments for the runners are illustrated. The runners may be composed of the same materials found in ski and snowboard construction. The forward and rear portions of the runners may be curved upward as shown in FIGS. 1 and 3. FIG. 4 shows cross-sectional views of various embodiments of the runners, with the snow-side of the runner facing up. FIG. 4*a* shows a runner 404 with a single protuberance 408 in the center of its snow-side that runs for a significant portion of the length of the runner. The protuberance may be tapered at each of its two ends. Fixed to the protuberance may be a rail 412 that runs for a significant portion of the length of the protuberance 408. The surfaces 416 are at a slight angle to horizontal, forming two shallow channels 420 between the protuberance 408 and the edge of the runner. This embodiment may allow for better lateral control of the apparatus as the snow-side of the runners are sliding along the snow or on other surfaces. The rail 412 comprises a hardened material capable of holding an edge on ice surfaces. The rail 412 can be selected from the group consisting of metal material, ceramic material, diamond material, hardened plastic material, hardened polymer material and the like.

Another runner embodiment is shown in FIG. 4*b*. The snow-side surface of the runner 424 has two protuberances 428 running a signification portion of the length of the runner, and a rail 432 fixed to each protuberance 416 running a signification portion of the length of the protuberance.

Another runner embodiment is shown in FIG. 4*c* wherein two rails 440 running a significant portion of the length of the runner are fixed directly to the flat snow-side surface of the runner 436. The illustrations in FIGS. 4*a–4c* are non-limiting examples of a variety of embodiments for the runners.

Figure 5A:
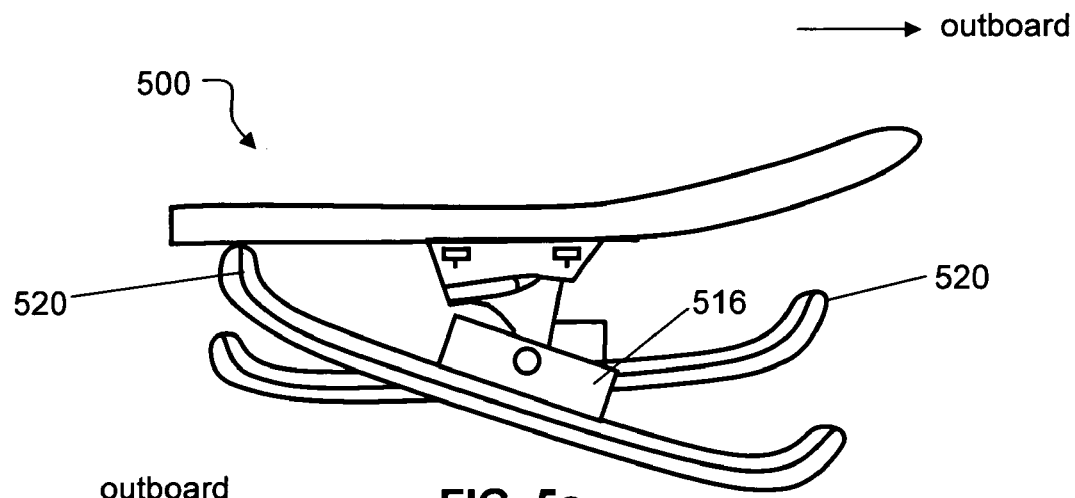
FIGS. 5a–5c are side views illustrating various exemplary runner non-level positions.
Figure 5B:
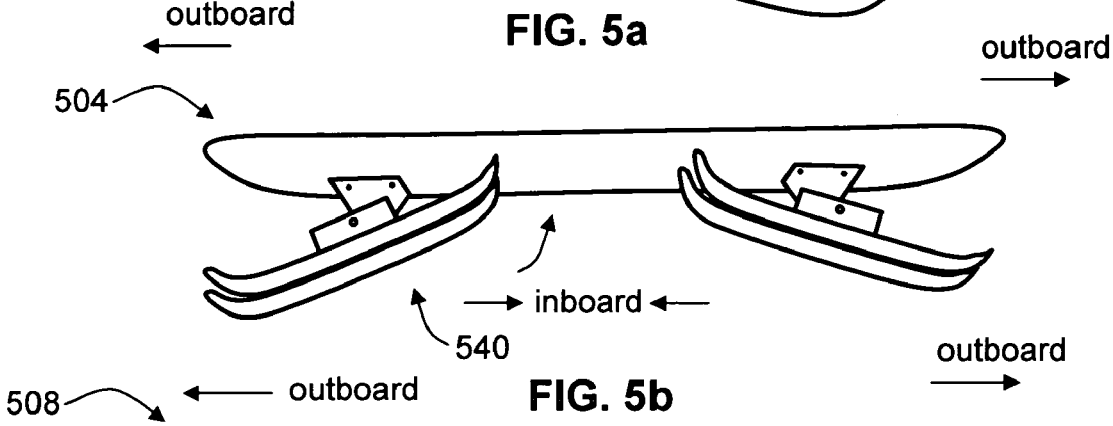
Figure 5C:
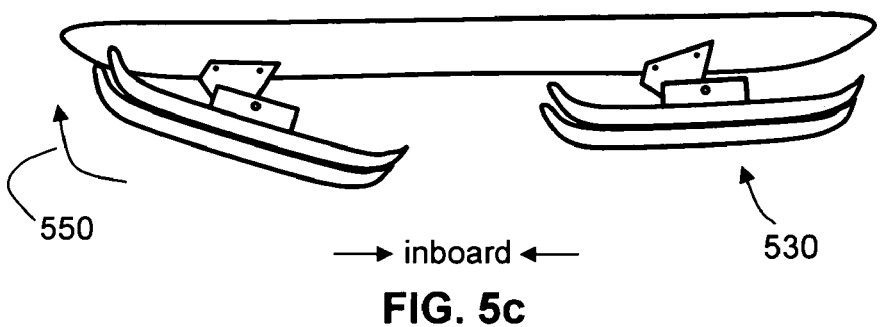

In one embodiment of the disclosed apparatus, when the apparatus is unmanned, the spring loaded mounts can retract to a non-level position, whereby at least one of the runners are made to be in a non-parallel angular orientation relative to the deck. This orientation may also be referred to as a "braking position". When the mounts are set to retract to a non-level position the snowskateboard cannot effectively glide forward when un-manned. In this way the board cannot maintain a straight course and will eventually turn against the fall line and cease moving. This function provides an automatic brake that inhibits a runaway snowskateboard. The mounting apparatus connecting the runners to the trucks can be set to retract to different non-level positions when the device has less than a minimum force acting on it. Referring to FIGS. 5*a–5c*, various embodiments of the automatic non-level positions of the runners are shown. Depending on the settings on the spring loaded mounts, many retraction positions are possible. In FIG. 5*a*, a pair of runners is shown on a disclosed apparatus 500 wherein one runner remains level and the other runner retracts to a position where it points down in the outboard direction. In FIG. 5*b*, another is shown wherein all the runners are shown pointing down in the outboard direction. FIG. 5C shows another retraction position wherein one pair of runners are pointed upward in the outboard direction, and the other pair of runners remain in the level position. The mounts 516 are configured to be adjusted such that the runners 520 are biased in at least one of a level position 530, a rear rotated position 540 and a forward rotated position 550. These and any other non-level positions may be rider adjustable via the mounts 516.

Figure 6:
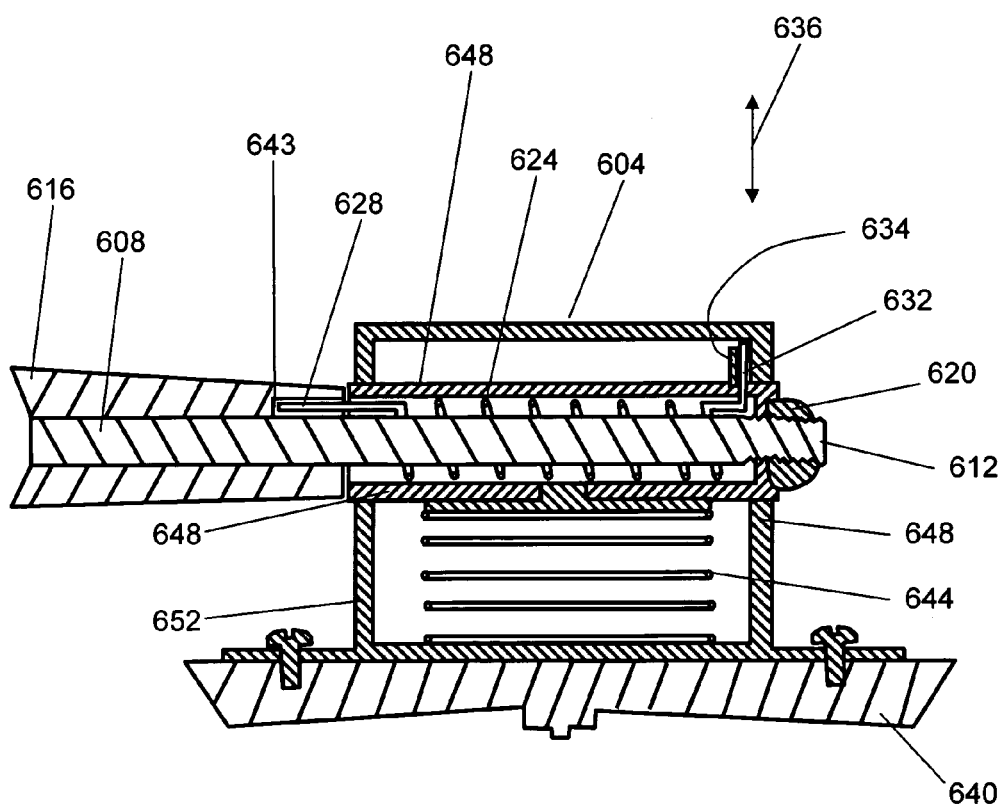
FIG. 6 is a front cross-sectional view of one exemplary embodiment of the spring loaded mounts.

FIG. 6 is a cross-sectional view of one embodiment of a spring loaded mount, from a front view orientation. The spring loaded mount is housed in a housing 604. The axle 608 of the truck 616 is rotateably disposed into the housing 604. The end of the axle 612 is threaded and a threaded nut 620 holds the axle within the housing. The spring loaded mount 604 is disposed over the axle 612. The housing 604 is rigidly attached to a runner 640. A coiled torsion spring 624 is rotateably fitted around the axle 608. A first end 628 of the torsion spring 624 is fixably attached to the truck 616 via a hole 643. There may be multiple holes set in the truck along the same circumference as hole 643, thus allowing for different torsional presets for the coiled torsion spring 624. A second end 632 of the torsion spring 624 is semi-fixably attached to the housing 604 via a channel 634 in the housing that allows for axial movement of the second end 632 in the direction indicated by the arrow 636, but does not allow for rotational movement of the second end 632. Thus, if there is a preset torsional force in the torsion spring 624, the runner will rotate in the direction of the resultant torsional force when there is little or no weight on the deck. If there is no preset torsional force in the torsion spring 624, the runner will remain level when there is little or no weight on the deck.

In another embodiment of the disclosed system, the spring loaded mount may configured to be quickly adjustable. The spring loaded mount may have a quick release connector, which may be similar to the quick release used for bicycle wheels, instead of a threaded nut 620 in FIG. 6. This quick adjustment system may also comprise a lever mechanism which retracts the first end of the spring 628 from the hole 644, thus allowing the user to rotate the spring loaded mount to a position where the first end of the spring 628 may be inserted into another hole on the truck, thus adjusting the non-level position of the runner.

Figure 7:
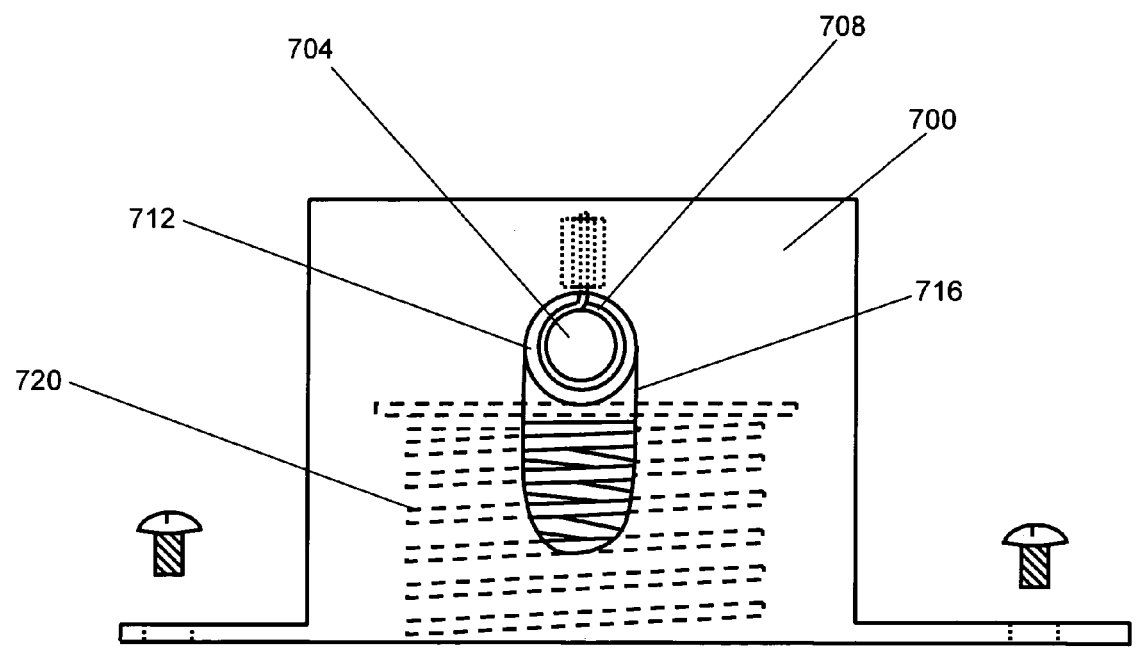
FIG. 7 is a side view of one exemplary embodiment of the spring loaded mount.

In a further embodiment of the disclosed apparatus, a compression spring 644 may provide an upward force against a sheath 648 fitted around the axle 612 and torsion spring 624. Thus, when there is a minimum amount of downward force on an axle 612, the axle 612 will ride in the top of slot 652, when there is more than a minimum amount of downward force on the axle 612, the axle 612 will ride down in the bottom of the slot 652. This relative positioning of the runners dependant on the forces will be referred to as "relative runner positioning." FIG. 7 is a side view of a spring loaded mount which provides another view of the disclosed apparatus. In FIGS. 6 and 7, the spring loaded mount is shown with the axle riding in the top of the slot.

In FIG. 7 the spring loaded mount housing 700 is shown. The axle 704, spring 708, and sheath 712 are riding in the top of the slot 716 due to the force of the compression spring 720 acting against the housing 700 and the sheath 712 surround the axle 714 and spring 708. Such a disclosed apparatus may improve the rideability of the apparatus by "raising" the unweighted runner(s) to the top of the slot 716, while the weighted runner(s) remain at the bottom of the slot 716 during turns and other maneuvers. The compression spring system may also provide some shock absorbing capability during jumping tricks or acrobatics on the disclosed apparatus.

Figure 8:
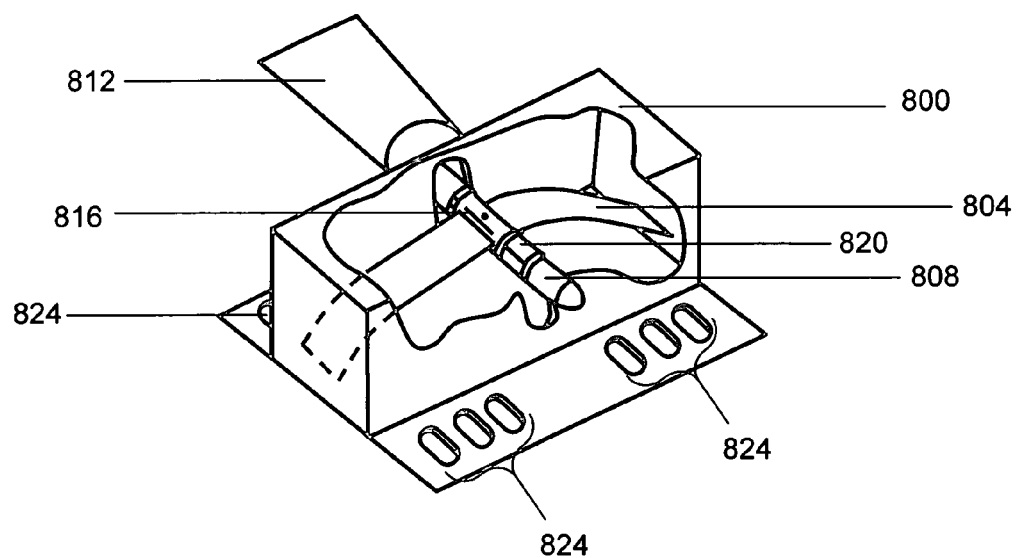
FIG. 8 is a perspective cut-away view of another exemplary embodiment of the spring loaded mount.
Figure 9:
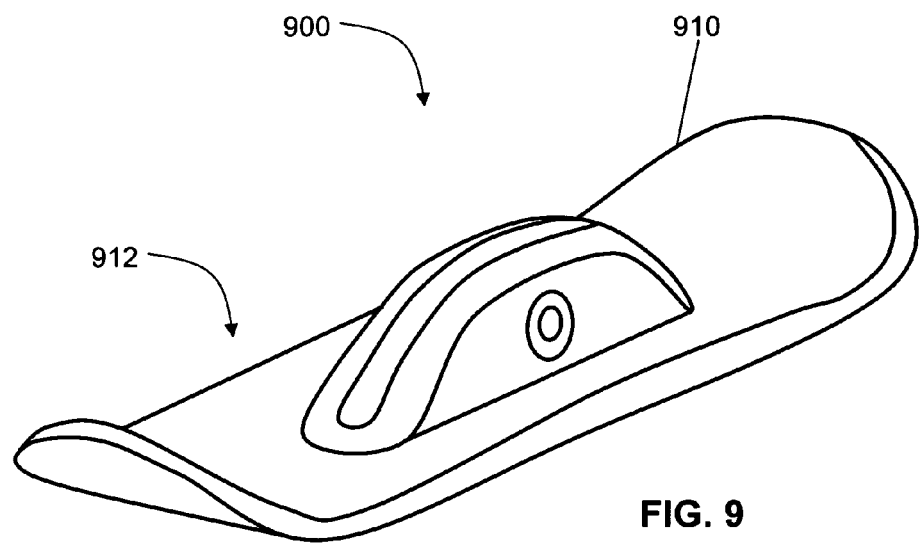
FIG. 9 is a perspective view of an exemplary embodiment of a runner.
Figure 10:
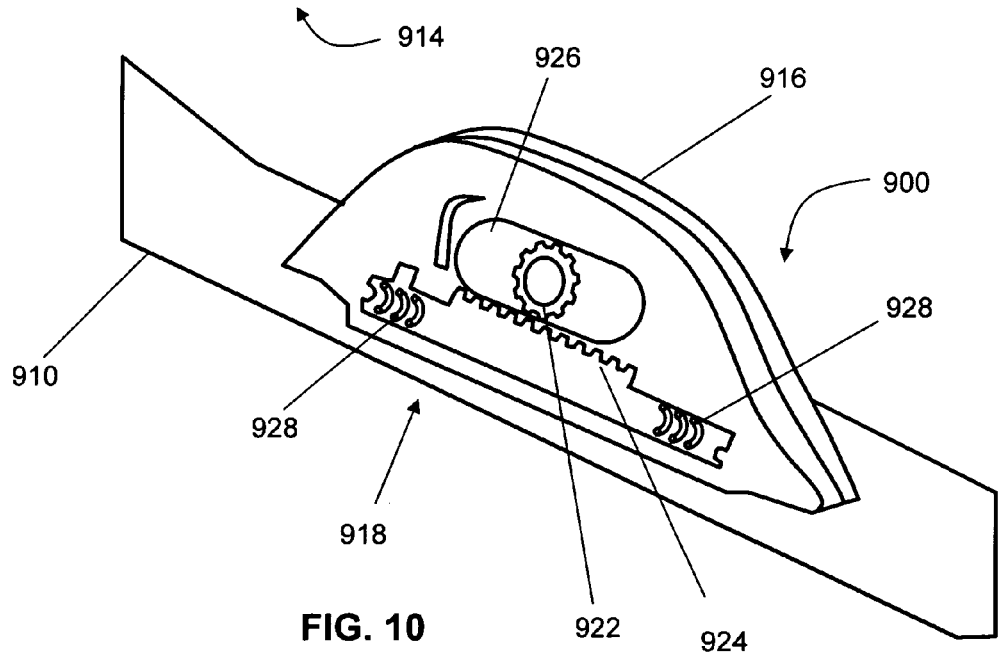
FIG. 10 is a perspective cut-away view of an exemplary embodiment of a runner.
Figure 11:
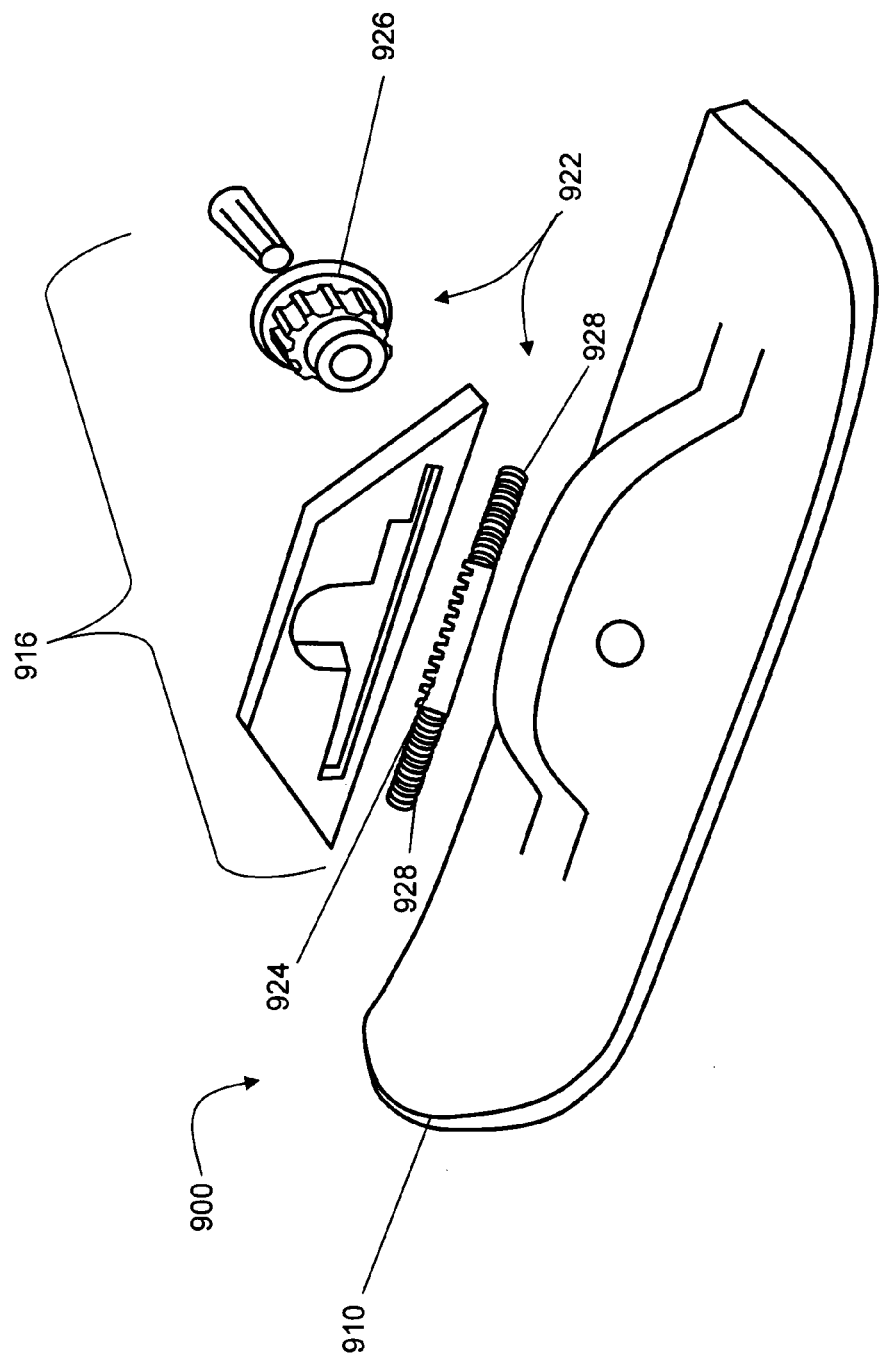
FIG. 11 is a perspective exploded view of an exemplary embodiment of a runner.
Figure 12:
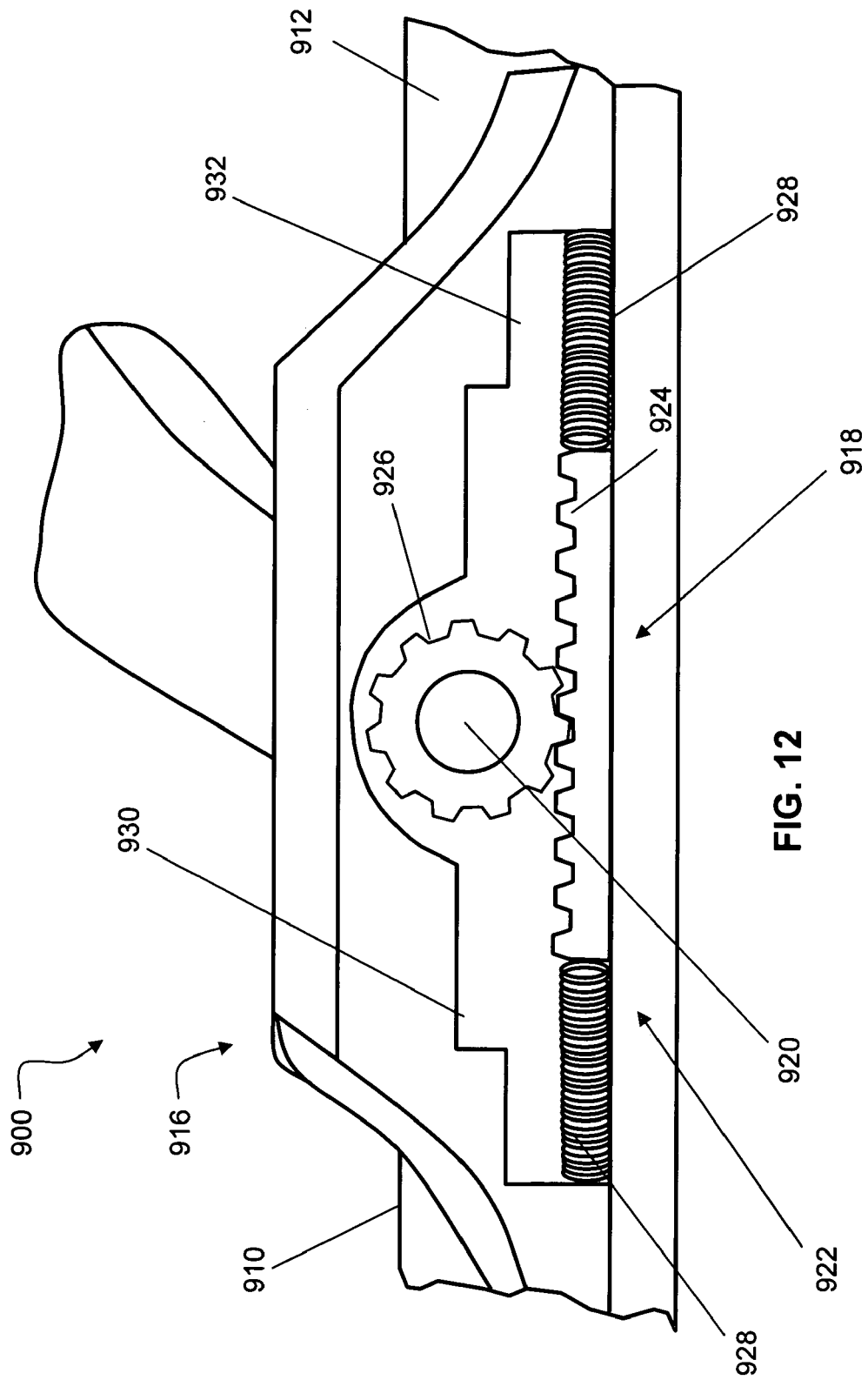
FIG. 12 is a perspective cut-away view of an exemplary embodiment of a runner.

FIG. 8 shows another embodiment of a spring loaded mount in a partial cut-away view. In this embodiment, the torsion spring and compression spring are replaced by a single leaf spring 804 within the spring loaded mount housing 800. The leaf spring couples to the axle 808 of the truck 812 via a fitted sleeve 816 which couples to a fitted surface 820 of the axle 808. The mount and runner may be removed from the axle and rotated clockwise or counter-clockwise and replaced on the axle thereby adjusting the preset on the leaf spring and thus adjusting the non-level position of the runner when there is a minimum force on the deck.

Still referring to FIG. 8, in another embodiment of the disclosed apparatus, the spring loaded mounts may have slots 824 disposed on the spring loaded mount housing. These slots 824 may allow for adjusting the runner relative to the spring loaded mounts to take into account varying deck sizes and for varying riding conditions. These slots 824 may be disposed on spring loaded housings with torsional springs, compression springs, leaf springs or any other type of spring device.

Referring to FIGS. 9 through 12 multiple views of an exemplary runner are illustrated. The runner 900 includes a runner body 910 having a top side 912 and a snow side 914. The runner body 910 includes biasing mount 916 mounted to said runner body 910. In an exemplary embodiment, the runner body 910 and biasing mount 916 can be integrally formed.

The biasing mount 916 includes a biasing member 918. The biasing mount 916 is configured to bias the runner body 910 in a torsional direction about the axle 920. The biasing member 918 can be configured as a rack and pinion biasing mechanism 922. The rack and pinion biasing mechanism 922 includes a rack 924 and corresponding pinion gear or simply pinion 926. The rack and pinion biasing mechanism 922 includes a rack biasing member 928. The rack biasing member 928 can be disposed on sides of the rack 924. The rack biasing member 928 can comprise a spring, resilient material and the like. The runner body 910 can form a rack and pinion biasing mechanism housing 930 including a rack biasing member cavity 932 configured to contain the rack and pinion mechanism 922. The rack biasing member cavity 932 can contain the rack biasing members 928. The rack and pinion biasing mechanism 922 can be adjusted. The adjustment of the rack and pinion biasing mechanism 922 can alter the torsional forces applied to the axle 920 and runner body 910. The relationship of the runner 900 relative to the axle 920 can be adjusted into level position, rear rotated position and front rotated position, as well as other combinations of positions as described in detail above. The biasing mount 916 can be formed in the runner body 910 offset as shown, or in other positions along the top side 912 of the runner body 910.

In another embodiment of the disclosed system, the leaf spring spring loaded mount may have a quick release connector, to allow for quick adjustment of the non-level position.

In an other embodiment of the disclosed apparatus, the magnitude of the minimum force acting on a spring loaded mount which moves the runner from a non-level position to a riding position can be changed by the manufacturer or by a rider by replacing or adjusting the springs or spring-like mechanisms within the spring loaded mounts or by replacing the spring loaded mounts.

There are many means which can be used to provide a torsional force to rotate the runner from a riding position to a non-level position. Some non-limiting examples of such means are: various leaf spring configurations, use of flexible materials such as plastics and fiberglass to provide torsional forces, any sort of spring like materials which may provide torsional forces.

In another embodiment of the apparatus, the rider may be able to adjust the riding position of the runners to alternative positions, such that the runners may have varying angles relative to the deck for various alternative riding positions. These alternative riding positions may be beneficial to the riders on various terrains or for various tricks, maneuvers and acrobatics.

In another embodiment of the apparatus, the rider may be able to adjust the non-level position of the runners to alternative non-level positions, such that the runners may have varying angles relative to the deck for various alternative non-level positions. These alternative non-level positions may be beneficial to the riders on various terrains or for various tricks and maneuvers.

While embodiments and applications of this disclosed system have been shown and described, it would be apparent to those skilled in the art that many more modifications than mentioned above are possible without departing from the inventive concepts herein. The disclosed system, therefore, is not to be restricted except in the spirit of the appended claims.

The invention claimed is:

1. A snowskateboard comprising:
   a support deck having an upper side and a lower side opposite said upper side;
   a first truck mounted to said lower side, said first truck including a first yoke having a first axle disposed in said first yoke;

a first left runner disposed over said first axle and a first right runner disposed over said first axle opposite said first left runner;

a first biasing mount disposed over said first axle and mounted in each of said first left runner and said first right runner, said first biasing mount having a first biasing member configured to bias said first biasing mount in a torsional direction relative to said first axle;

a second truck mounted to said lower side distal from said first truck, said second truck including a second yoke having a second axle disposed in said second yoke;

a second left runner disposed over said second axle and a second right runner disposed over said second axle opposite said second left runner;

a second biasing mount disposed over said second axle and mounted in each of said second left runner and said second right runner, said second biasing mount having a second biasing member configured to bias said second biasing mount in a torsional direction relative to said second axle; and wherein each of said first biasing member and said second biasing member comprise a rack and pinion mechanism, wherein said rack is disposed between rack biasing members.

2. The snowskateboard of claim 1 wherein each of said first left runner, said first right runner, said second left runner and said second right runner include a runner body defining a rack biasing member cavity configured to house a rack biasing member.

3. The snowskateboard of claim 2 wherein said rack biasing member is disposable over one of said first axle and said second axle.

4. The snowskateboard of claim 2 wherein said rack biasing member is disposable over one of said first axle and said second axle.

5. A snowskateboard comprising:

a support deck having an upper side and a lower side opposite said upper side;

a first truck mounted to said lower side, said first truck comprising a first truck base having a first truck base body, said first truck base body including a mount side and a support side opposite said mount side, said first truck base body including a front end and a rear end opposite said front end, said truck base body including a first pivot support formed in said support side proximate said rear end of said first truck base body and a first coupling support formed in said support side proximate said first front end of said first truck base body, said first truck comprising a first truck yoke having a first yoke body, said first yoke body including a first axle support portion and a first coupling portion extending from said first axle support portion and a first pivot portion extending from said first axle support portion distal from said first coupling portion, said first coupling portion configured to couple to said first coupling support and said first pivot portion configured to couple to said first pivot support, said first truck yoke having a first axle disposed in said first axle support portion substantially orthogonal to said first coupling portion and said first pivot portion of said first yoke body, said first axle having a left side and a right side opposite said left side;

a first left spring loaded mount disposed over said left side of said first axle and a first right spring loaded mount disposed over said right side of said first axle, said first left spring loaded mount and said first right spring loaded mount each including a first biasing member configured to bias said first left spring loaded mount and said first right spring loaded mount in a torsional direction relative to said first axle;

a first left runner disposed over said first left spring loaded mount;

a first right runner disposed over said first right spring loaded mount;

a second truck mounted to said lower side distal from said first truck, said second truck comprising a second truck base having a second truck base body, said second truck base body including a second mount side and a second support side opposite said second mount side, said second truck base body including a second front end and a second rear end opposite said second front end, said second truck base body including a second pivot support formed in said second support side proximate said second rear end of said second truck base body and a second coupling support formed in said second support side proximate said second front end of said second truck base body, said second truck comprising a second truck yoke having a second yoke body, said second yoke body including a second axle support portion and a second coupling portion extending from said second axle support portion and a second pivot portion extending from said second axle support portion distal from said second coupling portion, said second coupling portion configured to couple to said second coupling support and said second pivot portion configured to couple to said second pivot support, said second truck yoke having a second axle disposed in said second axle support portion substantially orthogonal to said second coupling portion and said second pivot portion of said second yoke body, said second axle having a left side and a right side opposite said left side;

a second left spring loaded mount disposed over said left side of said second axle and a second right spring loaded mount disposed over said right side of said second axle, said second left spring loaded mount and said second right spring loaded mount each including a second biasing member configured to bias said second left spring loaded mount and said second right spring loaded mount in a torsional direction relative to said second axle;

a second left runner disposed over said second left spring loaded mount;

a second right runner disposed over said second right spring loaded mount; and wherein each of said first biasing members and said second biasing members comprise a rack and pinion mechanism, wherein said rack is disposed between rack biasing members.

6. The snowskateboard of claim 5 wherein each of said first left runner, said first right runner, said second left runner and said second right runner include a runner body defining a rack and pinion biasing mechanism housing configured to house a rack and pinion biasing mechanism.

* * * * *